(12) United States Patent
Min et al.

(10) Patent No.: US 12,546,358 B2
(45) Date of Patent: Feb. 10, 2026

(54) BOLT FOR BATTERY AND BATTERY MODULE

(71) Applicant: SK ON CO., LTD., Seoul (KR)

(72) Inventors: Seon Gi Min, Daejeon (KR); Dong Min Kim, Daejeon (KR); Won Kyeong Kim, Daejeon (KR); Ho Yeon Kim, Daejeon (KR)

(73) Assignee: SK On Co., Ltd., Seoul (KR)

( * ) Notice: Subject to any disclaimer, the term of this patent is extended or adjusted under 35 U.S.C. 154(b) by 208 days.

(21) Appl. No.: 18/088,054

(22) Filed: Dec. 23, 2022

(65) Prior Publication Data

US 2023/0400050 A1   Dec. 14, 2023

(30) Foreign Application Priority Data

Jun. 9, 2022   (KR) .................. 10- 2022-0070232

(51) Int. Cl.
| | |
|---|---|
| *H01M 50/271* | (2021.01) |
| *F16B 23/00* | (2006.01) |
| *F16B 33/02* | (2006.01) |
| *F16B 35/04* | (2006.01) |

(52) U.S. Cl.
CPC .......... *F16B 33/02* (2013.01); *F16B 23/0038* (2013.01); *H01M 50/271* (2021.01); *F16B 35/048* (2013.01)

(58) Field of Classification Search
CPC ...... F16B 35/04; F16B 35/048; F16B 23/003; F16B 23/007; F16B 35/047
USPC ........................................................ 411/403
See application file for complete search history.

(56) References Cited

U.S. PATENT DOCUMENTS

| | | | | | |
|---|---|---|---|---|---|
| 2,382,019 | A | * | 8/1945 | Edwin ................. | F16B 25/0073 411/386 |
| 3,352,190 | A | * | 11/1967 | Carlson ................. | F16B 23/003 411/386 |
| 4,073,160 | A | * | 2/1978 | Perret ................... | F16B 23/003 464/158 |
| 4,477,217 | A | * | 10/1984 | Bonacorsi ........... | F16B 25/0047 411/387.4 |
| 5,137,407 | A | * | 8/1992 | Yamamoto ............ | F16B 23/003 411/404 |

(Continued)

FOREIGN PATENT DOCUMENTS

| | | |
|---|---|---|
| JP | 2810940 B2 | 10/1998 |
| JP | 5146869 B2 | 2/2013 |

(Continued)

OTHER PUBLICATIONS

Decision of Accelerated Examination for Korean Patent Application No. 10-2022-0070232 issued by the Korean Patent Office on Mar. 6, 2023 and Search Report submitted for the Accelerated Examination to the Korean Patent Office.

(Continued)

*Primary Examiner* — Flemming Saether
(74) *Attorney, Agent, or Firm* — IP & T GROUP LLP

(57) ABSTRACT

A bolt for a battery includes a head in which at least a portion of a socket is formed, a threaded body including a threaded area in which a spiral thread is formed, and a reinforcing neck connected between the head and the threaded body and having a diameter increasing in a direction from the threaded body toward the head.

14 Claims, 8 Drawing Sheets

(56) References Cited

U.S. PATENT DOCUMENTS

| | | | | |
|---|---|---|---|---|
| 5,413,442 | A | * | 5/1995 | Grey .................... E01B 7/10 411/386 |
| 5,540,531 | A | * | 7/1996 | Choiniere ........... F16B 25/0063 411/387.1 |
| 8,182,187 | B2 | | 5/2012 | Siong |
| 9,476,444 | B2 | * | 10/2016 | Droste ................ F16B 37/122 |
| 9,761,851 | B2 | * | 9/2017 | Onodera ........... H01M 50/3425 |
| 10,221,946 | B1 | * | 3/2019 | Pai ..................... F16B 23/0076 |
| 10,336,211 | B2 | | 7/2019 | Kobayashi et al. |
| 10,603,998 | B2 | * | 3/2020 | Toyota .................... B60L 50/66 |
| 11,594,775 | B2 | * | 2/2023 | Terauchi ........... H01M 10/0481 |
| 11,901,582 | B2 | * | 2/2024 | Terauchi .............. H01M 10/46 |
| 12,132,219 | B2 | * | 10/2024 | Yamashiro ............... B60K 1/04 |
| 2003/0143057 | A1 | * | 7/2003 | Shinjo ................ F16B 25/0021 411/387.1 |
| 2003/0223842 | A1 | * | 12/2003 | Shinjo .................... F16B 35/06 411/403 |
| 2007/0201966 | A1 | * | 8/2007 | Wu ....................... F16B 35/048 411/403 |
| 2007/0243043 | A1 | * | 10/2007 | Price ....................... F16B 25/00 411/386 |
| 2009/0260489 | A1 | | 10/2009 | Siong |
| 2010/0129176 | A1 | * | 5/2010 | Karupaya ............. F16B 23/003 411/404 |
| 2021/0239148 | A1 | | 8/2021 | Dilling |
| 2023/0009126 | A1 | * | 1/2023 | Plaschkes ........... F16B 25/0068 |
| 2023/0213049 | A1 | * | 7/2023 | Cho ..................... B25B 23/005 411/337 |

FOREIGN PATENT DOCUMENTS

| | | | |
|---|---|---|---|
| JP | 2019-133755 | A | 8/2019 |
| JP | 6996317 | B2 | 2/2022 |
| KR | 20-0184099 | Y1 | 6/2000 |
| KR | 10-1658027 | B1 | 9/2016 |
| KR | 10-2019-0110402 | A | 9/2019 |
| KR | 10-2023209 | B1 | 9/2019 |
| KR | 20210047116 | A | 4/2021 |
| KR | 10-2280451 | B1 | 7/2021 |
| WO | WO-2006083229 | A1 * | 8/2006 ............. B21K 1/463 |

OTHER PUBLICATIONS

Office Action for Korean Patent Application No. 10-2022-0070232 issued by the Korean Patent Office on Mar. 20, 2023.

Decision of Rejection on Reexamination for the Korean Patent Application No. 10-2022-0070232 issued from the Korean Intellectual Property Office on Nov. 28, 2023.

Office Action for Korean Patent Application No. 10-2024-0002940 issued by the Korean Patent Office on Aug. 13, 2025.

* cited by examiner

BOLT FOR BATTERY AND BATTERY MODULE

CROSS-REFERENCE TO RELATED APPLICATION

The present application claims priority under 35 U.S.C. § 119(a) to Korean patent application number 10-2022-0070232, filed on Jun. 9, 2022, in the Korean Intellectual Property Office, the entire disclosure of which is incorporated herein by reference.

BACKGROUND

1. Technical Field

The present disclosure generally relates to a battery, and more particularly, to a bolt for a battery and a battery module.

2. Related Art

A battery is an energy power source used to drive various electronic devices, vehicles, and the like. A battery may be classified into a battery cell, a battery module, a battery pack, and the like, according to units.

The battery cell may include a cathode, an anode, and a separator disposed therebetween. The battery module may include a plurality of battery cells. The battery pack may include a plurality of battery modules.

Covers of the battery module or battery pack may be coupled through bolts. In the case of a general bolt, there is an issue in that space efficiency is lowered by a head of the bolt protruding toward the outside. When the height of the bolt head is lowered, there is an issue in that a fastening torque is lowered. There is a need for a method of improving the space efficiency of the battery module and improving the fastening torque.

SUMMARY

Embodiments provide a bolt for a battery and a battery module capable of improving a fastening torque of the battery module or a battery pack.

In accordance with an aspect of the present disclosure, there is provided a bolt for a battery including a head in which at least a portion of a socket is formed, a threaded body including a threaded area in which a spiral thread is formed, and a reinforcing neck connected between the head and the threaded body and having a diameter increasing in a direction from the threaded body toward the head.

In an embodiment, the bolt may further include a dog point connected to a lower surface of the threaded body, and the dog point may include a first section having a constant diameter which is smaller than the diameter of the lower surface of the threaded body.

In an embodiment, the dog point may further include a second section connected between the lower surface of the threaded body and an upper surface of the first section and having a diameter decreasing in a direction from the lower surface of the threaded body toward the upper surface of the first section.

In an embodiment, the diameter of the reinforcing neck may increase with a constant rate value in the direction from the threaded body toward the head.

In an embodiment, an upper surface of the reinforcing neck may be connected to a lower surface of the head, and the diameter of the upper surface of the reinforcing neck may be smaller than the diameter of the lower surface of the head.

In an embodiment, a difference value between diameters of an upper surface of the head and a lower surface of the head may be less than or equal to a reference value.

In an embodiment, the threaded body may include a coating layer covering a portion of the threaded area.

In an embodiment, the remaining portion of the socket may be formed in the reinforcing neck connected to the head, and the socket may comprise a part recessed in the head and the reinforcing neck according to a predetermined shape.

In an embodiment, the predetermined shape of the socket lay be a hexalobular plus shape in which six polygons surround a periphery of a central circle.

In accordance with another aspect of the present disclosure, there is provided a battery module including a bolt including a head in which at least a portion of a socket is formed, a reinforcing neck connected to the head, and a threaded body connected to the reinforcing neck and including a threaded area in which a thread is formed, a plurality of covers coupled with the bolt inserted into a fastening hole, and a plurality of battery cells accommodated in an inner space formed by the plurality of covers. The reinforcing neck may have a diameter increasing in a direction from the threaded body toward the head.

In an embodiment, the bolt may further include a dog point connected to a lower surface of the threaded body, and the dog point may include a first section having a constant diameter which is smaller than the diameter of the lower surface of the threaded body.

In an embodiment, the dog point may further include a second section connected between the lower surface of the threaded body and an upper surface of the first section and having a diameter decreasing in a direction from the lower surface of the threaded body toward the upper surface of the first section.

In an embodiment, the diameter of the reinforcing neck may increase with a constant rate value in the direction.

In an embodiment, a lower surface of the head may be connected to an upper surface of the reinforcing neck, and a diameter of the lower surface of the head may be larger than the diameter of the upper surface of the reinforcing neck.

In an embodiment, a difference value between diameters of an upper surface of the head and a lower surface of the head may be less than or equal to a reference value.

In an embodiment, the threaded body may include a coating layer covering a portion of the area in which the thread is formed.

In an embodiment, the remaining portion of the socket may be formed in the reinforcing neck, and the socket may be a part recessed in the head and the reinforcing neck according to a predetermined shape so that a bit is inserted.

In an embodiment, the predetermined shape may comprise a hexalobular plus shape in which six polygons surround a periphery of a central circle.

According to example embodiments of the present disclosure, it is possible to provide a bolt for a battery and a battery module capable of improving a fastening torque of the battery module or a battery pack.

According to example embodiments of the present disclosure, it is possible to provide a bolt for a battery capable of improving density of and miniaturizing a battery module or a battery pack.

According to example embodiments of the present disclosure, it is possible to provide a bolt for a battery capable of minimizing damage to a bit.

According to example embodiments of the present disclosure, it is possible to provide a bolt for a battery preventing loosening.

According to example embodiments of the present disclosure, it is possible to provide a bolt for a battery capable of improving assembly properties.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Figure 1A:
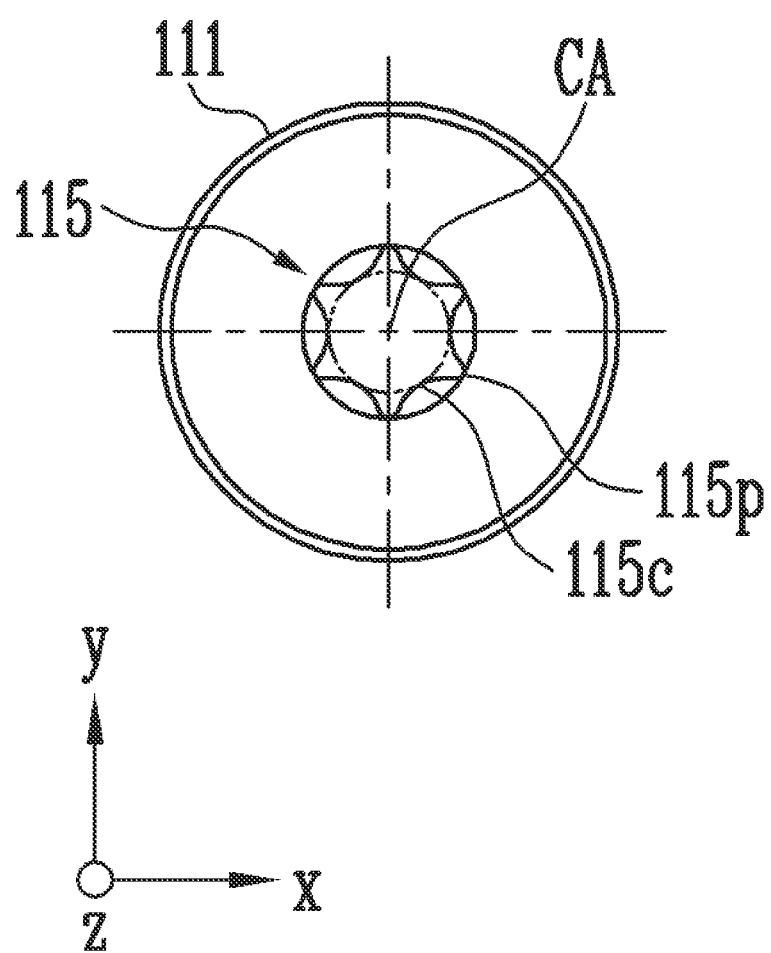
FIG. 1A and FIG. 1B illustrate a bolt for a battery in accordance with an embodiment of the present disclosure.
Figure 1B:
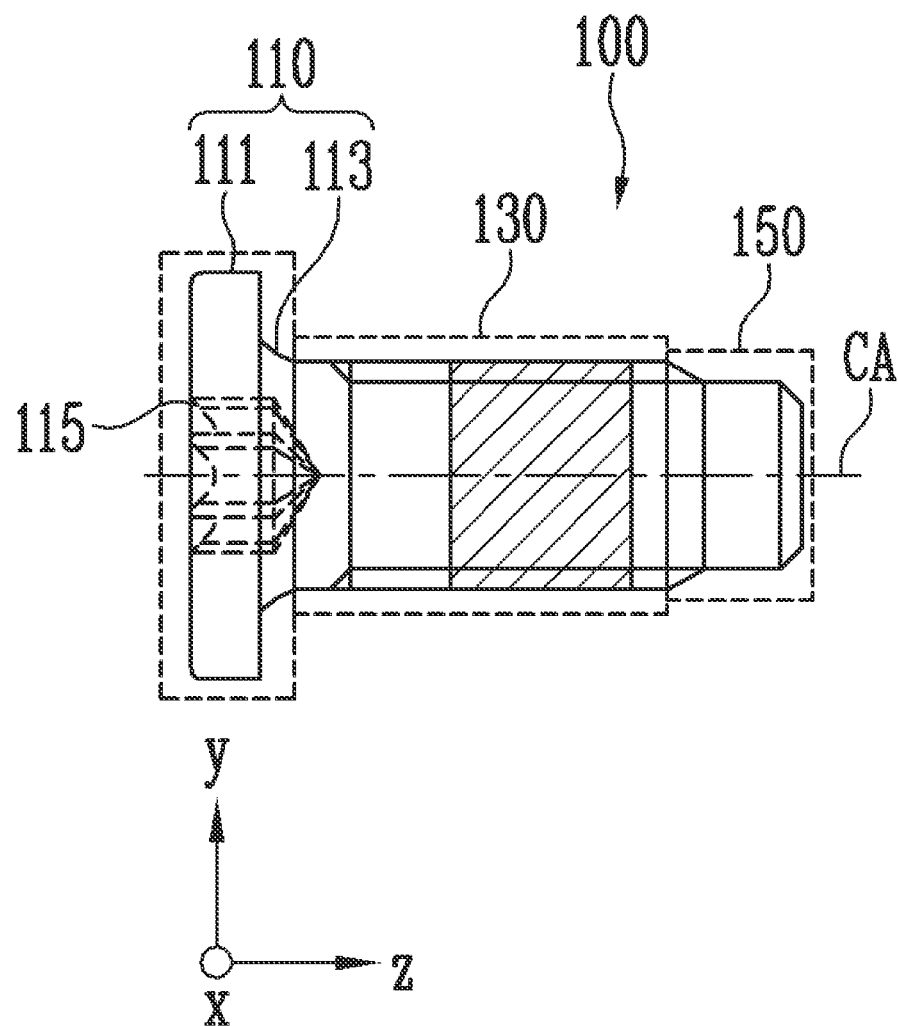

FIG. 1A and FIG. 1B illustrate a bolt for a battery in accordance with an embodiment of the present disclosure. Here, FIG. 1A illustrates an upper surface of a head 111 on the icy plane, and FIG. 1B illustrates a side of a bolt 100 on the zy plane.

Referring to FIG. 1A and FIG. 1B, the bolt for a battery 100 may include a fastening part 110 and a threaded body 130. In accordance with an embodiment of the present disclosure, the bolt for the battery 100 may be used to couple battery cells as a unit of a battery module or a battery pack. For example, the bolt for the battery 100 may be used to couple covers of the battery module or the battery pack.

The fastening part 110 may be formed with a socket 115 into which a bit is inserted. The socket 115 may be a part recessed according to a predetermined shape. In other words, the socket 115 may be an area into which the bit is inserted. For this, the bit may have a shape corresponding to the shape of the socket 115. The bit and socket 115 may be in an embossed and engraved relationship. The bolt 100 is rotated by the rotation of the bit inserted into the socket 115, so that the bolt 100 may be coupled to a nut.

The threaded body 130 may include a threaded area in which a thread is formed. The thread may be spirally formed on an outer circumferential surface of a cylinder. A groove may be formed between two threads adjacent to each other in the z-axis direction. The groove may be smaller in height than the thread. Here, the height may be a distance in the y-axis direction. The distance between two threads adjacent to each other in the z-axis direction may be defined as 1 pitch. The thread of the bolt 100 may be coupled to the nut in a form engaged with a groove of the nut.

The fastening part 110 may include a head 111 and a reinforcing neck 113.

The upper surface of the head 111 may be the surface exposed to the outside when the bolt 100 is fastened. For example, the upper surface may be a surface located in the (−) z-axis direction. The upper surface of the head 111 may be a circular plane. In an embodiment, the upper surface of the head 111 may have a flat shape. The height of the head 111 may be designed as a preset value. Here, the height may be a distance in the z-axis direction. As the height of the head 111 decreases, an area exposed to the outside decreases, so that the space efficiency of the battery module to which the bolt 100 is applied may be improved.

The lower surface of the head 111 may be connected to the reinforcing neck 113. For example, the lower surface may be a surface located in the (+) z-axis direction. The lower surface of the head 111 may include a connection area and a bearing area. The connection area may be an area where the head 111 is connected to the reinforcing neck 113, and the bearing area may be an area where the head 111 contacts the cover of the battery module.

The head 111 may be formed with at least a portion of the socket 115. In an embodiment, a portion of the socket 115 may be formed in the head 111, and the remaining portion of the socket 115 may be formed in the reinforcing neck 113. In this case, the height of the socket 115 may be greater than the height of the head 111. Here, the height may be a distance in the z-axis direction. In order to sufficiently transmit rotational force of the bit, the contact area between the fastening part 110 and the bit must be secured at a certain level, as the height of the head 111 decreases, the socket 115 may be formed in the area spanning the head 111 and the reinforcing neck 113. However, this is merely an embodiment, and all of the socket 115 may be formed in the head 111. In this case, the height of the socket 115 may be less than or equal to the height of the head 111.

The reinforcing neck 113 may be connected between the head 111 and the threaded body 130. Specifically, the reinforcing neck 113 may connect between the lower surface of the head 111 and the upper surface of the threaded body 130. For example, the head 111, the reinforcing neck 113, and the threaded body 130 may be sequentially connected so that a central axis (CA) coincides with each other.

The reinforcing neck 113 may have a diameter that increases in a direction from the threaded body 130 toward the head 111. Here, the diameter may indicate a diameter of a circle in a cross-section in one direction. For example, one direction may be a z-axis direction or the central axis (CA) direction.

In accordance with the embodiment of the present disclosure, when the bolt 100 is fastened, a fastening torque of the bolt 100 may be improved by the reinforcing neck 113 connecting between the head 111 and the threaded body 130. Here, when the bolt 100 is fastened to the nut, the fastening torque may indicate the magnitude of the torque applied to the bolt 100 or the nut when the bolt 100 is not broken. For example, due to a shape in which the diameter of the reinforcing neck 113 increases, the area of the connection portion between the head 111 and the reinforcing neck 113 increases, accordingly breakage of the bolt 100 may not occur even if the torque with a larger magnitude is applied when the bolt 100 is fastened.

The socket 115 may be a part recessed according to a predetermined shape. For example, as shown in FIG. 1A, the socket 115 may be an area recessed in the z-axis direction in the predetermined shape.

In an embodiment, the predetermined shape may be a hexalobuar plus shape in which six polygons 115*p* surround a periphery of a central circle 115*c*. For example, the polygon 115*p* may be a triangle, a trapezoid, or a pentagon. The polygons 115*p* are disposed on the periphery of the central circle 115*c*, and may be symmetrically disposed with regard to the central axis CA. According to the present disclosure, when the bit inserted into the socket 115 is rotated, it is possible to minimize damage to the bit. The above-described embodiment is merely one embodiment, and the shape and number of polygons 115*p* may be variously modified and implemented.

In an embodiment, the bolt 100 may further include a dog point 150. The dog point 150 may be connected to the lower surface of the threaded body 130. For example, the head 111, the reinforcing neck 113, the threaded body 130, and the dog point 150 may be sequentially connected so that the central axis CA coincides with each other.

The dog point 150 may include a first section. Here, the first section may be a section having a constant diameter in the z-axis direction. The first section may have a smaller diameter than the diameter of the lower surface of the threaded body 130. The thread may not be formed at the dog point 150. The dog point 150 is the first part to be inserted when the bolt 100 is inserted into the nut, and the thread of the bolt 100 may function to guide a groove of the nut to be aligned and engaged. In accordance with the embodiment of the present disclosure, it is possible to improve the ease of assembly of the bolt 100 by the dog point 150.

Figure 2A:
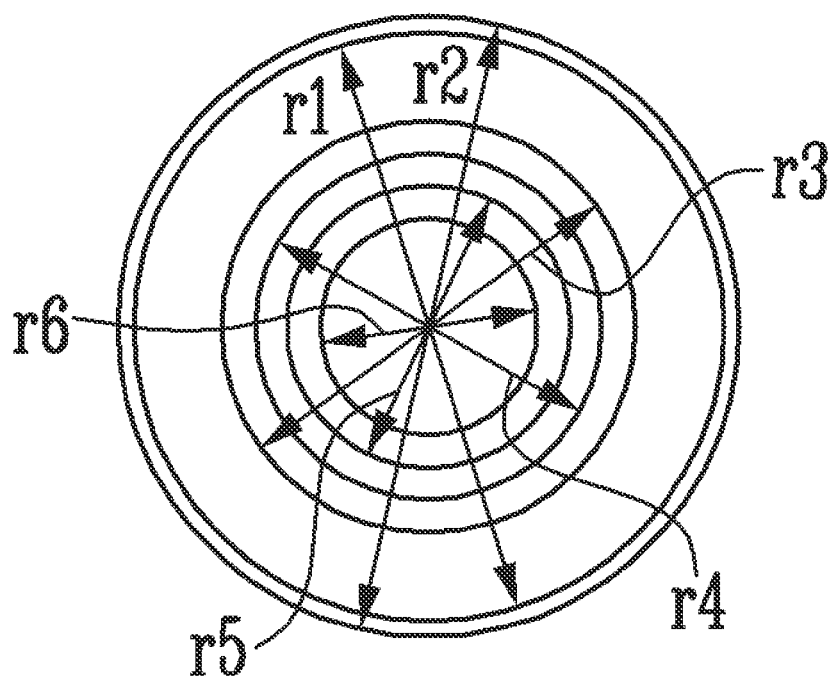
FIG. 2A and FIG. 2B illustrate a detailed configuration of a bolt in accordance with an embodiment of the present disclosure.
Figure 2B:
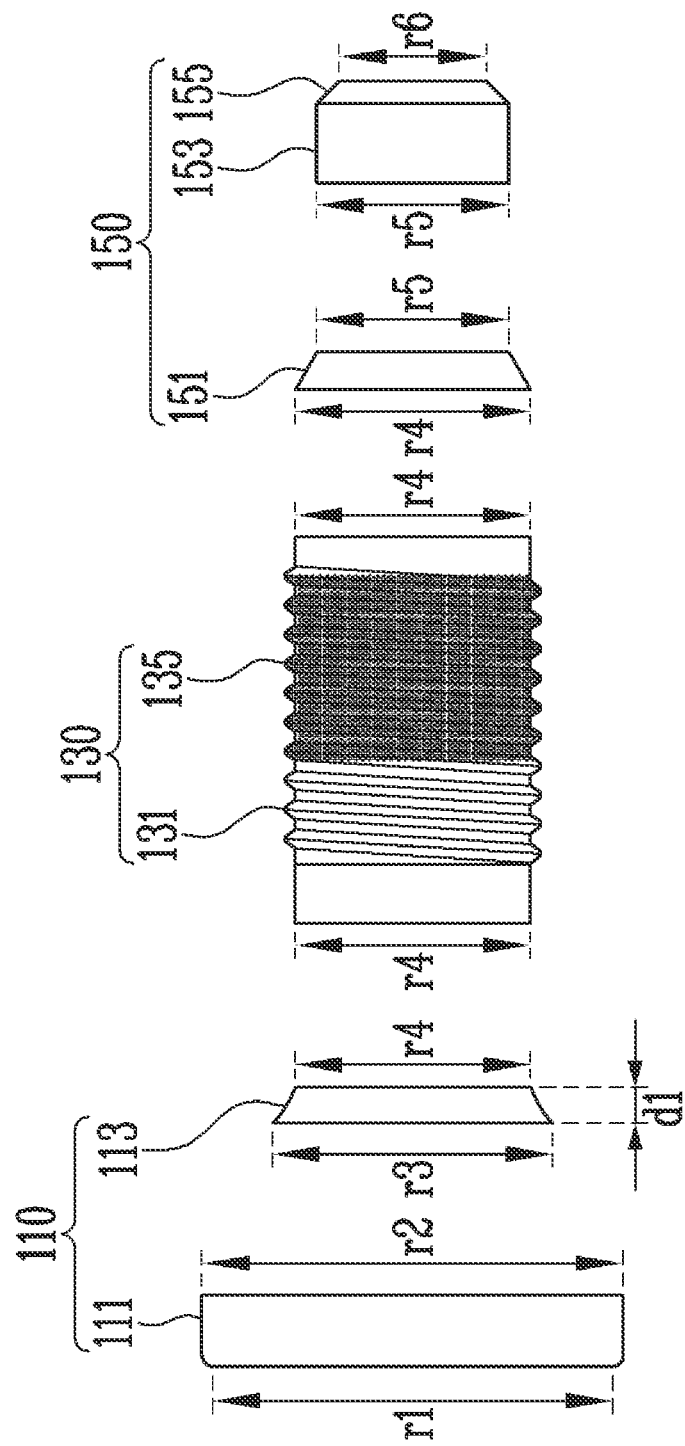

FIG. 2A and FIG. 2B illustrate a detailed configuration of the bolt in accordance with an embodiment of the present disclosure. Here, FIG. 2A illustrates the diameter of the detailed configuration of the bolt 100 on the xy plane, and FIG. 2B illustrates the separated detailed configuration of the bolt 100 on the zy plane.

Referring to FIG. 2A and FIG. 2B, the fastening part 110 may include the head 111 and the reinforcing neck 113.

The head 111 may be formed in a flat shape. For example, a difference value between a diameter r1 of the upper surface of the head 111 and a diameter r2 of the lower surface of the head 111 may be less than or equal to a reference value. For example, the difference value between the diameter r1 of the upper surface of the head 111 and the diameter r2 of the lower surface of the head 111 may be included in a range of 0 mm or more and the reference value or less. Here, the reference value is a value greater than 0 mm, and may be a predetermined value.

A diameter r3 of the upper surface of the reinforcing neck 113 and the diameter r2 of the lower surface of the head 111 may have different values. For example, the diameter r3 of the upper surface of the reinforcing neck 113 may be smaller than the diameter r2 of the lower surface of the head 111.

The diameter r3 of the upper surface of the reinforcing neck 113 may be greater than a diameter r4 of the lower surface of the reinforcing neck 113. The diameter may increase from the lower surface of the reinforcing neck 113 toward the upper surface of the reinforcing neck 113.

In an embodiment, the diameter from the lower surface of the reinforcing neck 113 toward the upper surface of the reinforcing neck 113 may increase according to a constant rate value. Here, the rate value may be the difference between the diameter r3 of the upper surface of the reinforcing neck 113 and the diameter r4 of the lower surface of the reinforcing neck 113 against a distance d1 between the upper and lower surfaces of the reinforcing neck 113. For example, the rate value may be the value in which the difference between the diameter r3 of the upper surface of the reinforcing neck 113 and the diameter r4 of the lower surface of the reinforcing neck 113 is 1.0 mm when the distance d1 between the upper and lower surfaces of the reinforcing neck 113 is 0.75 mm. However, this is merely an example, and the rate value of the difference between the diameter r3 of the upper surface of the reinforcing neck 113 and the diameter r4 of the lower surface of the reinforcing neck 113 against the distance d1 between the upper and lower surfaces of the reinforcing neck 113 may be modified to various values and implemented.

In an embodiment, the distance d1 between the upper and lower surfaces of the reinforcing neck 113 may be greater than or equal to the value of the difference between the diameter r3 of the upper surface of the reinforcing neck 113 and the diameter r4 of the lower surface of the reinforcing neck 113. In another embodiment, the distance d1 between the upper and lower surfaces of the reinforcing neck 113 may be less than or equal to the value of the difference between the diameter r3 of the upper surface of the reinforcing neck 113 and the diameter r4 of the lower surface of the reinforcing neck 113.

In one embodiment, the diameter in the direction from the lower surface of the reinforcing neck 113 toward the upper surface of the reinforcing neck 113 may increase according to different rate values for each section. In other words, the diameter may increase in a stepwise manner in the direction from the lower surface of the reinforcing neck 113 toward the upper surface of the reinforcing neck 113.

The threaded body 130 may include a threaded area 131 in which the thread is formed. In an embodiment, the threaded body 130 may include a coating layer 135 covering a portion of the threaded area 131.

The diameter r4 of the upper surface and the diameter r4 of the lower surface of the threaded body 130 may have the same value. However, this is merely an example, and the diameter r4 of the upper surface and the diameter r4 of the lower surface of the threaded body 130 may be modified to have different values and implemented.

The dog point 150 may include a plurality of sections 151, 153, and 155. The plurality of sections may include at least one of a first section 153, a second section 151, and a third section 155.

In an embodiment, the second section 151 may be connected between the lower surface of the threaded body 130 and the upper surface of the first section 153. The third section 155 may be connected to the lower surface of the first section 153.

The diameter r4 of the upper surface of the second section 151 may be the same as the diameter r4 of the lower surface of the threaded body 130. The diameter r4 of the upper surface of the second section 151 may have a larger value than the diameter r5 of the lower surface of the second section 151. In an embodiment, the second section 151 may have the diameter that decreases from the lower surface of the threaded body 130 toward the upper surface of the first section 153.

The diameter r5 of the first section 153 may have the same value. In other words, the diameters r5 of the upper and lower surfaces of the first section 153 may have the same value. The diameter r5 of the first section 153 may be smaller than the diameter r4 of the lower surface of the threaded body 130. A diameter r6 of the lower surface of the third section 155 connected to the first section 153 may be smaller than the diameter r5 of the first section 153. Accordingly, it is possible to improve the ease of assembly of the bolt 100.

Figure 3:
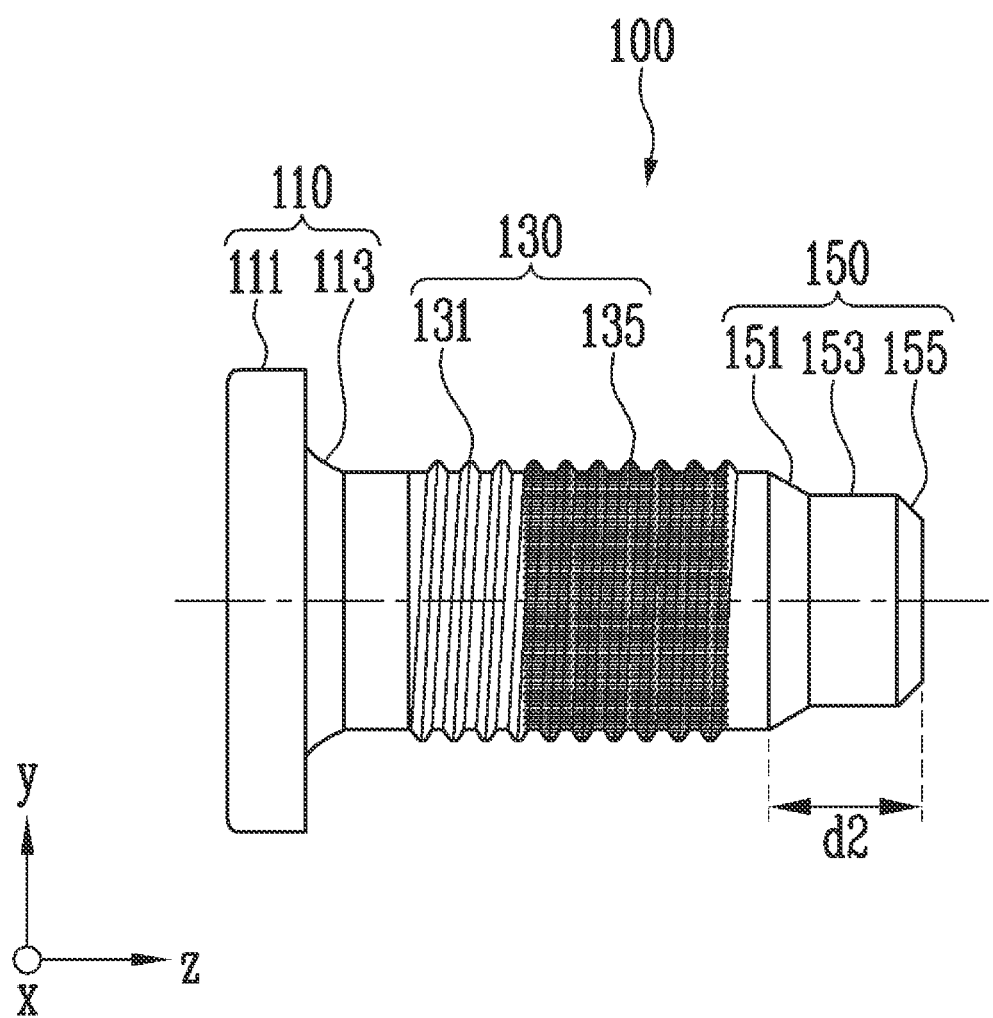
FIG. 3 illustrates a side of a bolt in accordance with an embodiment of the present disclosure.

FIG. 3 illustrates a side of the bolt in accordance with an embodiment of the present disclosure. Here, FIG. 3 illustrates the side of the bolt 100 on the zy plane.

Referring to FIG. 3, the battery bolt 100 in accordance with an embodiment of the present disclosure may include the fastening part 110, the threaded body 130, and the dog point 150. A description that overlaps with the above will be omitted.

The threaded body 130 may include the coating layer 135 covering the portion area of the threaded area. The coating layer 135 may be made of various materials such as rubber, silicone, and plastic. In an embodiment, the coating layer 135 may be formed by depositing a resin-based material on the portion area of the threaded area. For example, the resin-based material may be polypropylene (PP), polyethylene (PE), polycarbonate (PC), or the like. In accordance with an embodiment of the present disclosure, it is possible to prevent the bolt 100 from being loosened by the coating layer 135.

Here, the coating layer 135 may not be formed in an excluded area of the threaded area 131. The excluded area may be the area including the outermost thread or the area including from the outermost thread to the reference number of threads. The outermost thread may be a thread closest to the lower surface or upper surface of the threaded body 130. The reference number may be predetermined. This is to prevent the coating layer 135 from being pushed when the bolt 100 is fastened.

The bolt 100 in accordance with an embodiment of the present disclosure may be made of an alloy of various elements such as carbon, silicon, manganese, and phosphorus. The bolt 100 in accordance with an embodiment of the present disclosure may have a hardness value of 32 to 39 Rockwell hardness (HRC). Accordingly, the value of the torque at which the bolt 100 is broken may be increased. However, this is merely an example, and the material and hardness of the bolt 100 may be variously modified and implemented.

In an embodiment, a length d2 of the dog point 150 may be included in a range greater than or equal to the reference minimum value and less than or equal to the reference maximum value. Here, the length may be a distance in the z-axis direction. For example, the reference minimum value may be 1.0 mm and the reference maximum value may be 3.0 mm. However, this is merely an example, and the reference minimum value and reference maximum value may be modified into various values in consideration of the amount of threads engaged with the groove of the nut and a guide function.

Figure 4:
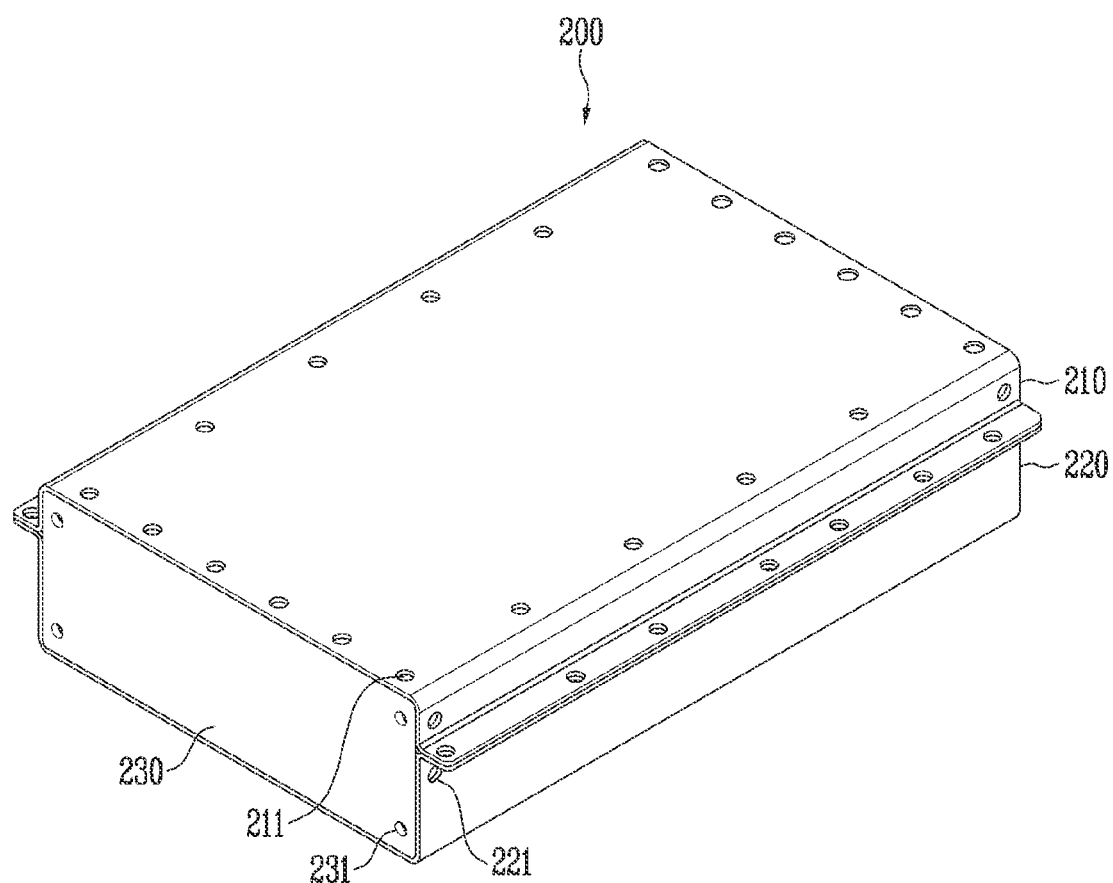
FIG. 4 illustrates a battery module in accordance with an embodiment of the present disclosure.

FIG. 4 illustrates a battery module in accordance with an embodiment of the present disclosure.

Referring to FIG. 4, a battery module 200 may include a plurality of battery cells and a plurality of covers 210, 220, and 230. A description of the battery cell will be described with reference to FIG. 6.

The plurality of covers 210, 220, and 230 may include an upper cover 210, a lower cover 220, and a side cover 230. The upper cover 210, the lower cover 220, and the side cover 230 may include fastening holes 211, 221, and 231. The upper cover 210, the lower cover 220, and the side cover 230 may be coupled to each other by the bolt 100 inserted into the fastening holes 211, 221, and 231. For example, in a state in which the fastening hole 211 of the upper cover 210 and the fastening hole 221 of the lower cover 220 are aligned to overlap each other, the bolt 100 may be inserted into each of the fastening holes 211 and 221. In this case, the bolt 100 is fastened to a screw formed in one of the fastening holes 211 and 221, and the upper cover 210 and the lower cover 220 may be coupled.

The plurality of covers 210, 220, and 230 of FIG. 4 are merely an example, and the shape and number of the plurality of covers 210, 220 and 230 may be variously modified.

Figure 5:
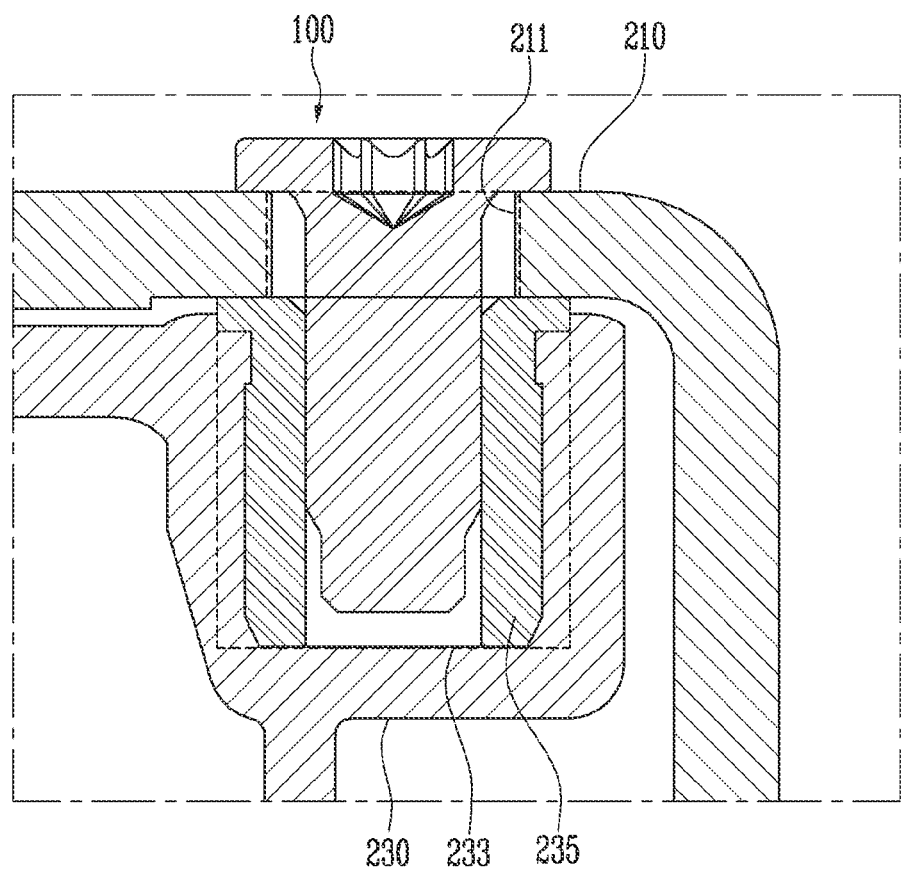
FIG. 5 illustrates coupling of a battery module in accordance with an embodiment of the present disclosure.

FIG. 5 illustrates coupling of a battery module an accordance with an embodiment of the present disclosure.

Referring to FIG. 5, the bolt 100 in accordance with an embodiment of the present disclosure may be coupled to a nut 235.

Specifically, in a state in which the fastening hole 211 of the upper cover 210 are aligned on the fastening hole 233 of the side cover 230, the bolt 100 may be inserted into the fastening holes 211 and 233, In this case, the dog point 150 of the bolt 100 may be inserted into the fastening holes 211 and 233 first.

In addition, as the bit inserted into the socket 115 of the bolt 100 rotates, the thread of the bolt 100 is engaged with the groove of the nut 235 formed in the fastening hole 233 of the side cover 230, and the bolt 100 may be fastened to the nut 235. The position of the bolt 100 may be fixed by the nut 235 of the side cover 230.

The bearing area of the lower surface of the head 111 of the bolt 100 may contact the upper surface of the upper cover 210, and the upper surface of the nut 235 may contact the lower surface of the upper cover 210. The position of the upper cover 210 may be fixed between the head 111 of the bolt 100 and the nut 235. Like this, the upper cover 210 and the side cover 230 may be coupled to each other by the bolt 100.

Figure 6:
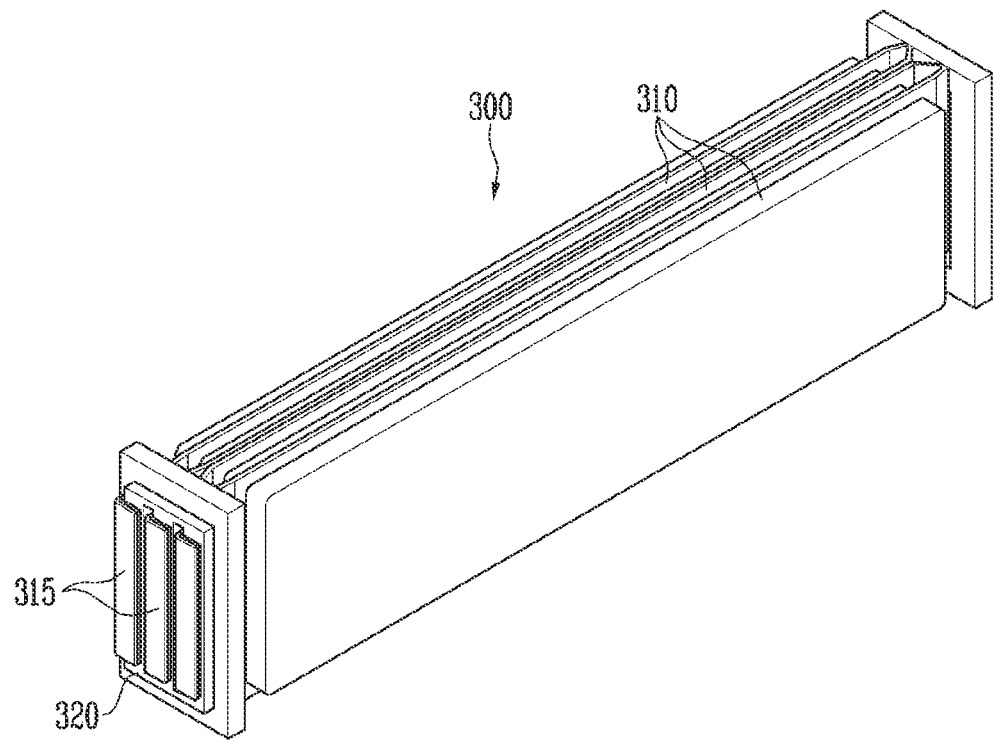
FIG. 6 illustrates a battery cell in accordance with an embodiment of the present disclosure.

FIG. 6 illustrates a battery cell in accordance with an embodiment of the present disclosure.

Referring to FIG. 6, a battery cell 310 may be a mini mum unit of a battery capable of being charged and discharged. For example, the battery cell 310 may be configured as a battery such as a lithium ion battery, a lithium ion polymer battery, a nickel cadmium battery, a nickel zinc battery, or the like. In addition, the type of the battery cell 310 may be a pouch type, a prismatic shape, a cylindrical shape, or the like.

The battery cell 310 may include a cathode, an anode, and a separator. Specifically, the battery cell 310 may be a form in which one or more cathodes and one or more anodes are disposed with a separator interposed therebetween. The separator may be positioned between the cathode and the anode. For example, the battery cell 310 may have a structure in which the cathode and anode with the separator interposed therebetween are alternately stacked.

The battery cell 310 may include an exterior material surrounding the cathode, the anode, and the separator. The battery cell 310 may include an electrode tab 315 exposed to the outside of the exterior material. The electrode tab 315 may include a cathode tab connected to the cathode and an anode tab connected to the anode.

There may be at least one battery cell 310. When there are a plurality of battery cells 310, the plurality of battery cells 310 may be stacked in one direction. The plurality of stacked battery cells 310 may be referred to as a battery cell stack 300.

The battery cell stack 300 may further include a bus bar 320. The bus bar 320 may be fixed in contact with each of the cathode tab and the abode tab. In this case, the bus bar 320 may electrically connect other battery cells 310 to each other.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the exemplary embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. A battery module comprising:
   a plurality of battery cells accommodated in an inner space formed by a plurality of covers; wherein the plurality of covers includes an upper cover forming an upper side of the inner space, and a side cover forming a lateral side of the inner space,
   a first fastening hole penetrating the upper cover;
   a second fastening hole penetrating the side cover and aligned with the first fastening hole;
   a nut inserted into the second fastening hole; and
   a bolt comprising:
   a head in which at least a portion of a socket is formed;
   a threaded body comprising a threaded area in which a spiral thread is formed; and
   a tapered reinforcing neck connected between the head and the threaded body and having a diameter increasing in a direction from the threaded body toward the head; and
   a dog point connected to a lower surface of the threaded body and having sections of reduced diameters extending away from the threaded body,
   wherein
   the bolt is fastened to the nut through the first fastening hole and configured to couple together a pair of the plurality of covers, and
   a height of a head of the bolt is less than a thickness of one of the pair the plurality of covers.

2. The battery module of claim 1, wherein the sections of the dog point comprise:
   a first section having a constant diameter which is smaller than a diameter of the lower surface of the threaded body,
   a second section connected between the lower surface of the threaded body and an upper surface of the first section and having a diameter decreasing in a direction from the lower surface of the threaded body toward the upper surface of the first section, and
   a third section connected to a lower surface of the first section and having a diameter smaller than the constant diameter of the first section.

3. The battery module of claim 2, wherein the diameter of the third section continuously increases in the direction from the threaded body toward the head.

4. The battery module of claim 1, wherein the hardness values of the head, the threaded body and the tapered reinforcing neck are 32 to 39 Rockwell hardness (HRC).

5. The battery module of claim 1, wherein the socket spans the head and the tapered reinforcing neck and extends into an unthreaded section of the threaded body.

6. The battery module of claim 1, wherein the height of the head of the bolt is less than a thickness of the upper cover.

7. The battery module of claim 1, wherein an upper surface of the tapered reinforcing neck is connected to a lower surface of the head, and
   a diameter of the upper surface of the tapered reinforcing neck is smaller than a diameter of the lower surface of the head.

8. The battery module of claim 1, wherein a difference value between diameters of an upper surface of the head and a lower surface of the head is less than or equal to a reference value.

9. The battery module of claim 1, wherein the threaded body comprises a coating layer covering a portion of the threaded area.

10. The battery module of claim 9, wherein the coating layer is formed by a resin-based material comprising polypropylene (PP), polyethylene (PE), or polycarbonate (PC).

11. The battery module of claim 1, wherein a remaining portion of the socket is formed in the tapered reinforcing neck connected to the head, and
    the socket comprises a part recessed in the head and the tapered reinforcing neck according to a predetermined shape.

12. The battery module of claim 1, wherein the height of the socket is greater than the height of the head.

13. The battery module of claim 1, wherein the head comprises:
    a connection area where the head is connected to the tapered reinforcing neck, and
    a bearing area where the head contacts the upper cover.

14. The battery module of claim 1, wherein the plurality of battery cells comprise electrode tabs, and
wherein the battery module further comprises a busbar electrically connecting the electrode tabs to each other.

* * * * *